(12) United States Patent
Greene et al.

(10) Patent No.: US 9,235,847 B2
(45) Date of Patent: Jan. 12, 2016

(54) ENERGY-DISUTILITY MODELING FOR AGILE DEMAND RESPONSE

(75) Inventors: Daniel H. Greene, Sunnyvale, CA (US); Haitham Hindi, Menlo Park, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 668 days.

(21) Appl. No.: 13/328,961

(22) Filed: Dec. 16, 2011

(65) Prior Publication Data

US 2013/0159157 A1 Jun. 20, 2013

(51) Int. Cl.
*G06F 9/44* (2006.01)
*G06F 17/50* (2006.01)
*G06Q 40/00* (2012.01)
*G06Q 30/02* (2012.01)
*G06Q 10/04* (2012.01)
*G06Q 50/06* (2012.01)

(52) U.S. Cl.
CPC ............ *G06Q 30/0202* (2013.01); *G06Q 10/04* (2013.01); *G06Q 30/02* (2013.01); *G06Q 30/0206* (2013.01); *G06Q 30/0283* (2013.01); *G06Q 50/06* (2013.01)

(58) Field of Classification Search
USPC ........................................................ 705/7.22
See application file for complete search history.

(56) References Cited

PUBLICATIONS

O'Neill, Daniel; Levorato, Marco; Goldsmith, Andrea; Mitra, Urbashi. Residential Demand Response Using Reinforcement Learning. 2010 First IEEE International Conference on Smart Grid Communications. Oct. 2010.*
Master the GRE. Peterson's. 2009. pp. 296-297.*

* cited by examiner

*Primary Examiner* — Jason M Borlinghaus
(74) *Attorney, Agent, or Firm* — Shun Yao; Park, Vaughan, Fleming & Dowler LLP

(57) ABSTRACT

An energy management system identifies one or more energy-load components, and generates an energy-disutility graph for the identified components. The energy-disutility graph can include, for each of a sequence of discrete time instances, one or more vertices that each corresponds to an alternative operating state for a component. Further, an arc that couples two vertices indicates an energy-disutility model corresponding to energy and disutility costs for the component. The energy management system also communicates an energy-demand bid to the energy provider, such that the energy-demand bid includes the energy-disutility graph.

30 Claims, 7 Drawing Sheets

ENERGY-DISUTILITY MODELING FOR AGILE DEMAND RESPONSE

RELATED APPLICATION

The subject matter of this application is related to the subject matter of the following applications:

U.S. patent application Ser. No. 13/297,068, entitled "USING PLANNING TO CONTROL DEMAND RESPONSE AND SUPPLY CHOICES IN A MANAGED ELECTRICAL SYSTEM," by inventors Daniel H. Greene, Haitham A. S. Hindi, Robert R. Price, Bryan T. Preas, and John Hanley, filed 15 Nov. 2011;

U.S. patent application Ser. No. 13/297,014, entitled "USING MODEL COMMUNICATION AS A PROTOCOL IN A MANAGED ELECTRICAL SYSTEM," by inventors Daniel H. Greene, Haitham A. S. Hindi, Robert R. Price, Bryan T. Preas, and John Hanley, filed 15 Nov. 2011;

U.S. patent application Ser. No. 13/297,028, entitled "HIERARCHICAL MODEL COMMUNICATION AND CONTROL IN A MANAGED ELECTRICAL SYSTEM," by inventors Daniel H. Greene, Haitham A. S. Hindi, Robert R. Price, Bryan T. Preas, and John Hanley, filed 15 Nov. 2011; and U.S. patent application Ser. No. 13/296,987, entitled "STAGGERING AND FEATHERING OF DEMAND RESPONSE AND ENERGY SUPPLY CHANGE IN A MANAGED ELECTRICAL SYSTEM," by inventors Daniel H. Greene, Haitham A. S. Hindi, Robert R. Price, Bryan T. Preas, and John Hanley, filed 15 Nov. 2011;

the disclosures of which are incorporated by reference in their entirety herein.

BACKGROUND

1. Field

This disclosure is generally related to power management. More specifically, this disclosure is related to generating an energy-demand bid that indicates an energy cost and a disutility cost for alternative operating states across time.

2. Related Art

In traditional electricity markets, economic mechanisms are frequently used to arrive at accurate incentives and to dispatch services. For example, an operator of a power system, such as an independent system operator (ISO), may request bids up to 24 hours in advance of a desired service. In response to the request, one or more suppliers, such as a power plant, may bid to supply power or ancillary services. Based on the received bids, the ISO may select or dispatch the services it needs to operate the power system or grid. In the case of contingency services (e.g., spinning reserve), the ISO may dispatch the services and compensate the corresponding suppliers for being available, even if these suppliers are not subsequently required to provide power. Therefore, the ISO can reduce overhead by being able to predict energy demand to dispatch only the necessary services.

The ISO's challenge in operating the grid, balancing supply and demand, is made more difficult by the uncertainty of the demand of loads, and the chance that suppliers of power may fail to deliver earlier contracted services. In traditional electricity markets this is addressed on the supply-side, for example, using price incentives, an ISO can elicit more supplies of power, and by purchasing ancillary services an ISO may have additional contingent reserves available to address imbalances in power. Traditionally the demand is less predictable and less controllable, contributing the problem rather than the solution of the imbalance. However, the integration of additional renewable sources of power, such as wind and solar, has brought additional uncertainty to the operation of the grid, and created an opportunity to improve operation of the grid through contributions from the demand-side.

With the deregulation of electricity markets, and the increased integration of communication and control technology in power systems, it is increasingly attractive for flexible electricity consumers (such as individual residences and businesses, which are hereinafter referred to as 'participants' or 'consumers') to contribute to grid stability in a manner similar to the supplier of power, either by responding to price signals and adjusting their consumption or by offering demand-side energy services to an ISO. Because individual loads are typically much smaller than suppliers of power, aggregators in the power system can combine the energy demand of multiple participants to provide large demand-side service to the ISO. An aggregator may be either an existing electric utility or it may be a third-party providing services independent of the electric utility supplying power.

SUMMARY

One embodiment provides an energy management system that identifies one or more components, and generates an energy-disutility graph for the identified components. The energy-disutility graph can include, for each of a sequence of discrete time instances, one or more vertices that each corresponds to an alternative operating state for a component. Further, an arc that couples two vertices indicates an energy-disutility model corresponding to energy and disutility costs for the component. The energy management system then communicates an energy-demand bid to the energy provider, such that the energy-demand bid includes the energy-disutility graph.

In some embodiments, the two vertices coupled by the arc correspond to two adjacent time instances of the energy-disutility graph.

In some embodiments, the energy-disutility model indicates an energy-consumption cost for the component during a time interval between the two adjacent time instances. The energy-disutility model can also indicate a disutility cost corresponding to a consumer's perceived cost of not utilizing the component during the time interval between the two adjacent time instances.

In some embodiments, the system generates the energy-disutility graph by selecting an unexpanded vertex of the energy-disutility graph, and determining state parameters for the unexpanded vertex based on a decode function associated with the component. The system also computes state parameters for a target-state of the component based on a state-transition function and a control-action function, and determines a second vertex corresponding to the target-state parameters based on an encode function associated with the component. The system then generates an arc that maps the unexpanded vertex to the target vertex so that the arc includes a disutility model for the component.

In some embodiments, the system can determine an energy-price vector, which indicates an expected price for energy over a sequence of discrete time instances. The system then selects a path through the energy-disutility graph that's optimized for the energy-price vector, and determines an operating schedule for a component based on the selected path.

In some embodiments, the system can determine the energy-price vector by receiving, from an energy provider, a proposed price for energy at one or more discrete time intervals.

In some embodiments, the system can determine the energy-price vector by determining an expected change in energy price for a future time instance. The system can then determine a new energy price by adding the expected change in energy price to a base energy price for the future time instance. The system can then store the new energy price at an entry of the energy-price vector that corresponds to the future time instance.

In some embodiments, the system can determine the expected change in energy price for the future time instance by determining an expected change in value to an energy-related parameter that influences a price for energy from an energy provider.

In some variations to these embodiments, the energy-related parameter is selected from the group consisting of: a weather forecast at the future time instance; a market price for an energy source at the future time instance; a holiday event for the future time instance; a day of month for the future time instance; a day of week for the future time instance; and a time of day for the future time instance.

BRIEF DESCRIPTION OF THE FIGURES

In the figures, like reference numerals refer to the same figure elements.

DETAILED DESCRIPTION

Figure 1:
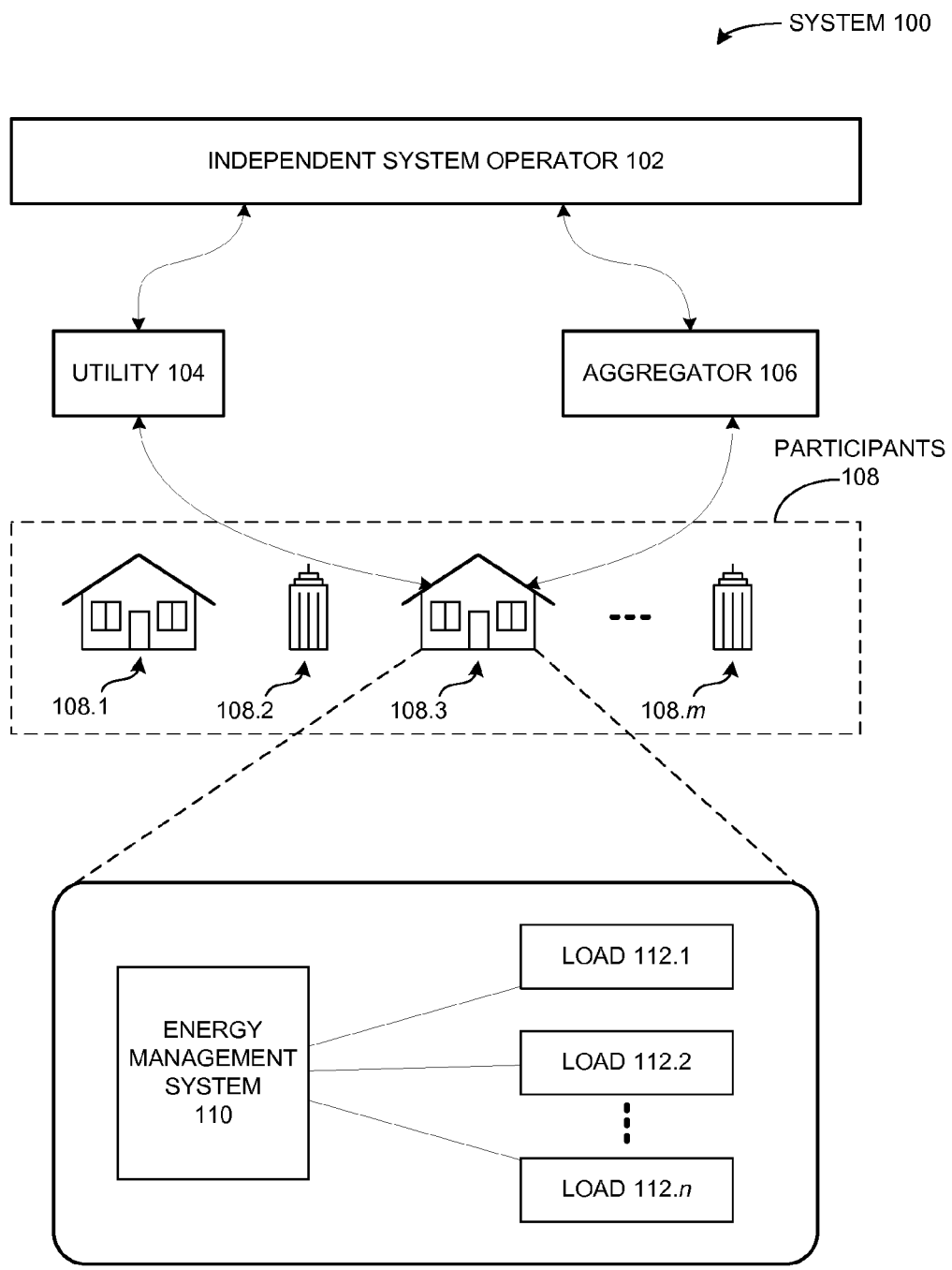
FIG. 1 illustrates an energy market in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of indicating to an energy retailer how one or more loads (components) are to consume energy over time, without transferring the loads' operating state information to the energy retailer. Specifically, in some embodiments, an energy management system can encode alternative operating states for a load to generate an energy-disutility graph whose arcs indicate an energy cost and a disutility cost for a certain time range. The energy retailer can use the energy and disutility costs from multiple consumers to determine energy prices that shift heavy energy usage away from peak hours.

For example, an air-conditioner has two alternative states for any given time instance: the air-conditioner can be either on or off. A consumer may typically program the air-conditioner to turn on if the indoor temperature exceeds a certain comfort level. However, if the energy prices increase as a result of a heat wave, the consumer may decide to not turn on the air-conditioner, or may decide to postpone turning on the air-conditioner until the indoor temperature reaches an undesirable temperature. The consumer's perceived cost of delaying use of a load (e.g., the air-conditioner) is referred to as the disutility cost. Therefore, the state information for the air-conditioner, which affects how the consumer chooses the operating schedule, can include additional parameters such as the room temperature, the consumer's desirable temperatures, and the consumer's intolerable temperatures.

The disutility can be a dollar valuation assigned to the discomfort of a consumer, such as discomfort caused by an increase in temperature due to a delay introduced into an air-conditioner's operating schedule, or a discomfort caused by not having clean dishes due to a delay introduced into a dishwasher's operating schedule. The use of the term "disutility" reflects its relationship to the concept of "utility" as used in economics. In the current context, the sign has been changed so that all components, including loads and supplies, have positive costs, and the origin has been moved so that normal operation has a "disutility" of zero.

In some embodiments, the consumer's energy management system can use this detailed state information to generate the energy-disutility graph that models alternative operating schedules for the load. The ideal operating schedule provides the best demand response to an energy retailer's prices. The energy-disutility graph is general enough to represent different types of loads, such that it represents the energy cost and the disutility cost for the consumer, while omitting state information for the load's operation.

Further, the energy-disutility graph is useful to the consumer's energy management system, and to the energy retailer (e.g., an energy aggregator). For example, if the consumer's system receives dynamic energy prices from the retailer, the system can automatically optimize the operation of one or more loads based on these energy prices. Also, an aggregator can use the energy-disutility graphs from multiple consumers to determine modifications to energy prices that achieve a large and predictable demand response over time, and can provide this demand response to a wholesale market. Thus, the aggregator creates value by building larger demand-response and providing economic rewards to participating consumers.

FIG. 1 illustrates an energy market 100 in accordance with an embodiment. In energy market 100, an independent system operator (ISO) 102 can dynamically match energy supply from energy services (not shown) to an overall load (e.g., energy demand from participants 108). Typically, ISO 102 predicts the energy load, and uses optimizations and market mechanisms to dispatch the primary and ancillary services required to successfully operate the power system. These energy services are often provided by large power plants or renewable energy resources.

Participants 108 can submit energy-demand bids to an energy retailer (e.g., ISO 102, a utility 104, or an aggregator 106) to participate in an energy program. For example, participant 108.3 can participate in a load curtailment program offered by utility company 104, or can participate in a retail-variable pricing program from utility company 104. In other examples, participant 108.3 can participate with aggregator 106 to submit energy demand to ISO 102 as part of a larger group.

Aggregator 106 can aggregate energy demand from multiple participants into larger and more predictable energy demand for the power system. Aggregator 106 can collect energy demand bids from participants 108, such that these bids include energy-disutility graphs that indicate how the demand from participants 108 may change in response to certain price fluctuations.

Some renewable energy resources (e.g., solar or wind) may provide peak power supply during certain hours of the day. Therefore, to encourage the use of these renewable energy resources, an energy retailer (e.g., ISO 102, utility 104, or aggregator 106) may alter the energy price to encourage consumers to shift their energy usage away from hours during peak demand, and toward the hours where energy is produced from a renewable energy resource.

In some embodiments, a participant may have an energy management system 110 that generates the energy-disutility graph and the energy-demand bid, and communicates the energy-demand bid to ISO 102, utility 104, or aggregator 106. Further, system 110 can also use the energy-disutility graph to determine an optimal operating schedule for one or more loads 112 (e.g., load 112.1) in response to an expected change in energy price.

System 110 can include a central computing device (e.g., a microcontroller or a computer system) that has a continuous connection to loads 112 (e.g., the consumer's home). System 110 can also include a computer system (e.g., a desktop, laptop, or mobile device such as a tablet or mobile phone) that periodically communicates with loads 112 (e.g., when a user turns on the system, or launches an energy-management application in the system). In some embodiments, system 110 can receive settings information from loads 112, which can indicate how the user has configured a load, and can include a history of operating schedules. Further, system 110 can provide a load with updated settings information, for example, to shift an operating schedule to take advantage of an upcoming reduction in energy price.

In some embodiments, the role of energy management system 110 may be embedded in a microcontroller in the load, so the load communicates its energy-demand bid directly with to utility 104, or aggregator 106.

Figure 2:
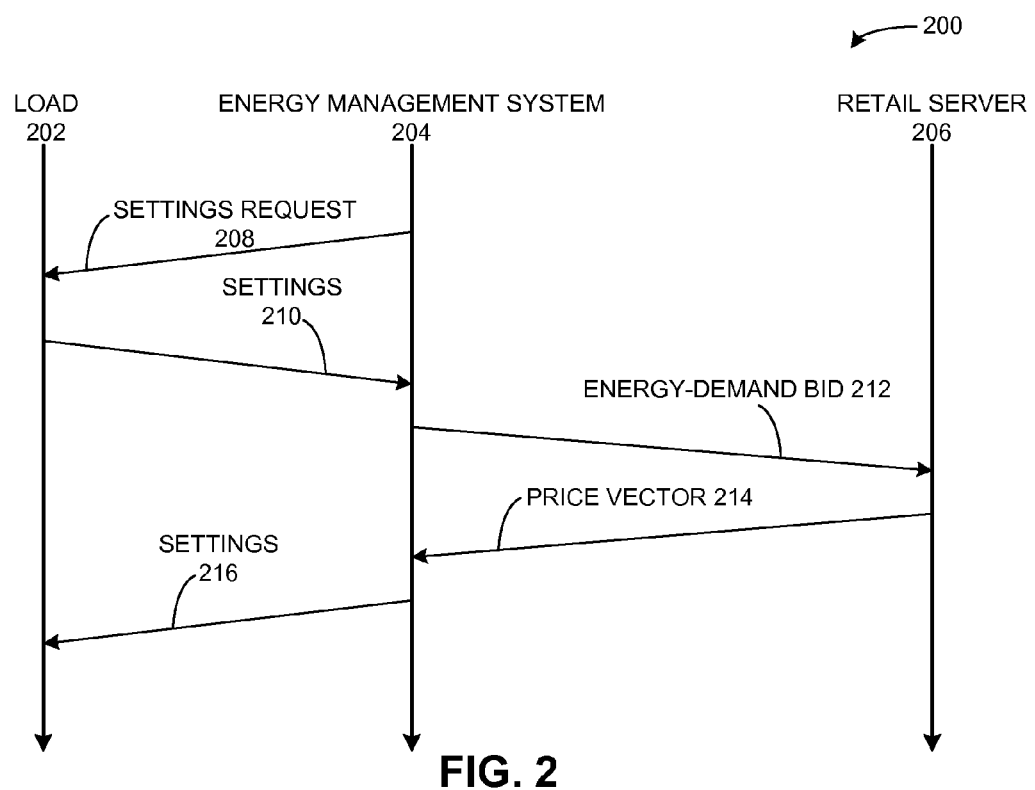
FIG. 2 illustrates an exemplary communication between a consumer's energy management system and an energy provider's retail server in accordance with an embodiment.

FIG. 2 illustrates an exemplary communication 200 between a consumer's energy management system and an energy provider's retail server in accordance with an embodiment. During operation, a consumer's energy management system 204 can periodically receive settings information from a load 202 (e.g., an electrical component). For example, system 204 can send a settings request 208 to load 202, and system 204 can receive settings information 210 from load 202. Settings information 210, for example, can indicate the current operating state for load 202 (e.g., a power state, a programmed operating schedule, device-specific parameters, etc.), and/or can indicate a histogram of past operating states.

In some embodiments, system 204 can use the histogram of past operating states to determine the disutility costs for load 202. System 204 may determine state information for when the user overrides the programmed operating schedule to activate load 202. For example, load 202 can correspond to an HVAC unit that has been programmed to turn on the air-conditioner when the temperature reaches 74 degrees. Thus, if a user sometimes overrides these settings when the indoor temperature exceeds 72 degrees, system 204 can determine that there is a disutility cost associated with the temperature exceeding 72 degrees.

An energy retailer's server 206 can receive an energy-demand bid 212 from a consumer (e.g., from system 204), such that the bid includes an energy-disutility graph that indicates how the consumer plans to shift operation of his energy loads in response to changes in energy prices. The energy-disutility graph can cover a certain sequence of time instances $\mathcal{T}$:

$$\mathcal{T} = \tau_1, \tau_2, \tau_3, \ldots \tau_T \tag{1}$$

Retail server 206 can use the energy-disutility graphs from a plurality of consumers to determine energy prices that optimize the load operating schedules across the plurality of consumers. For example, retail server 206 can determine a price vector 214 that influences energy management system 204 to select a path through the energy-disutility graph that reduces energy consumption during peak hours to within a desirable amount.

In some embodiments, retail server 206 can send time-of-use prices (TOU) or critical-peak-prices (CPP) to system 204 to influence the operating schedule for load 202. Retail server 206 can advertise these prices either several days in advance (TOU), or at least several hours in advance (CPP). To advertise these prices, the retail server 206 can construct price vector 214 that covers the time instances in $\mathcal{T}$:

$$\Lambda = \lambda_1, \lambda_2, \lambda_3, \ldots \lambda_T \tag{2}$$

In equation (2), the subscripts correspond to the indices for time instances in T. Also, boldface variables hereinafter indicate an ordered set, such as for a multidimensional variable.

Then, the consumer's energy management system 204 can analyze the energy-disutility graph with price vector 214, and determines a shortest path through the energy-disutility graph to determine an optimal operating schedule for load 202 that minimizes the user's overall energy cost and/or disutility cost.

Energy management system 204 can include: a controller of a load (e.g., an HVAC console); a home energy manager (e.g., a central computing device that communicates with multiple loads); or an online service (e.g., an online server coupled to multiple loads). In some embodiments, system 204 (e.g., a home energy manager or an online service) can generate the energy disutility graph for each of the multiple loads, and performs the optimization computation to select an optimal path. Then, system 204 uses the optimal path to determine an operating schedule for each load that indicates the load-specific control actions, and sends each operating schedule (e.g., settings 216) to the corresponding load (e.g., load 202).

In other embodiments, system 204 can receive the energy-disutility graph from multiple loads. System 204 then performs the optimization computation to select an optimal path, and sends the optimal path to the multiple loads (e.g., sends the optimal path via settings 216). Each load can then decode the vertices of the optimal path into an optimal operating schedule that indicates the load-specific control actions.

Figure 3:
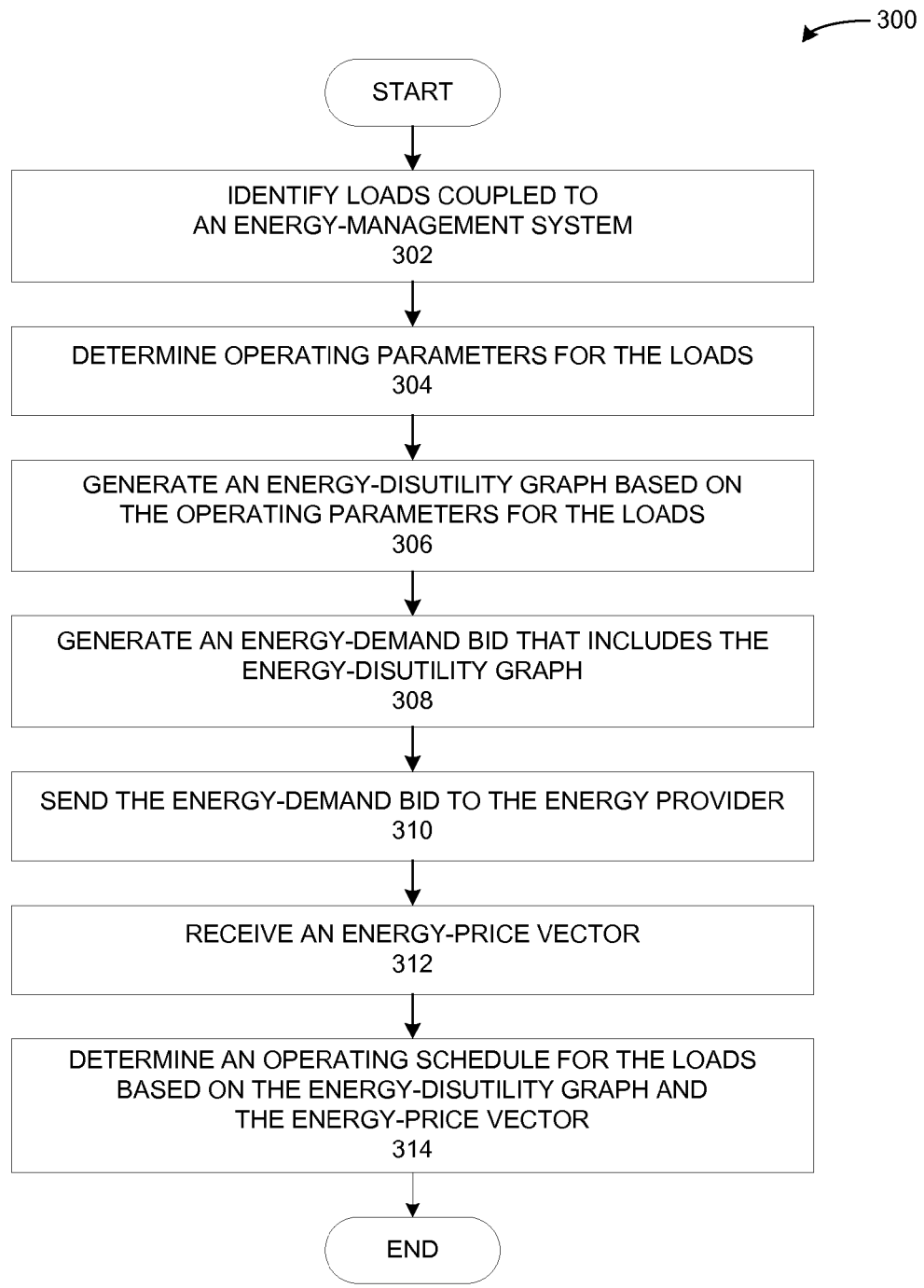
FIG. 3 presents a flow chart illustrating a method for sending an energy-demand bid to an energy provider in accordance with an embodiment.

FIG. 3 presents a flow chart illustrating a method for sending an energy-demand bid to an energy provider in accordance with an embodiment. During operation, the system can identify loads (electrical components) coupled to an energy management system (operation 302). The loads can include appliances (e.g., an HVAC system, a clothes washer or drier, a dishwasher, a refrigerator, an electric oven, a vacuum cleaner, a light fixture, etc.) or other electric devices (e.g., a home computer, a television, a sound system, etc.). The system then determines operating parameters for the loads (operation 304). In some embodiments, the system can gather these operating parameters from the loads (e.g., a histogram of operating states). In other embodiments, the system can gather these operating parameters by providing a questionnaire to the user, and converting the questionnaire response into the operating parameters. This information can include an operating schedule (e.g., repeated at a certain interval, such as every x days, y weeks, z months, etc.), and can indicate an accuracy granularity (e.g., minute, hourly, etc.).

This information can also indicate an operating cost (e.g., an amount of energy consumed), and a disutility cost (e.g., a perceived cost by the user if the apparatus isn't operated during its typical operating schedule). For example, a user may typically operate a dishwasher every two days once it becomes full. If the user were to wait an extra day to operate the dishwasher, a number of additional dishes may have to sit in the sink when there is insufficient additional space in the dishwasher, or the user may need to wash these additional dishes by hand. Therefore, there is a perceived cost by the user when the dishwasher isn't operated every two days. This perceived cost is modeled by the "disutility cost" associated with a load.

Next, the system generates an energy-disutility graph based on the operating parameters for the loads (operation 306). Then, the system generates an energy-demand bid that includes the energy-disutility graph (operation 308), and sends the energy-demand bid to the energy provider (operation 310). The system then receives an energy-price vector from the energy provider (operation 312), and determines an operating schedule for the loads based on the energy-disutility graph and the energy-price vector (operation 314).

Energy-Disutility Modeling

The energy cost and disutility cost of a load is modeled across a sequence of discrete time instances:

$$\mathcal{T} = \tau_1, \tau_2, \tau_3, \ldots \tau_T$$

The notation $T=|\mathcal{T}|$ indicates the number of time instances, and $t=1, 2, \ldots T$ indicates an index into the samples. The special terminal times $\tau_0$ and $\tau_{T+1}$ indicate the source and sink states, respectively, for the load. In some embodiments, the time values in $\mathcal{T}$ can be irregularly spaced (e.g. short-term, fine-grained and long-term, coarse-grained). For example, the time values can include short-term, fine-grained time values (e.g., with 30 minute intervals) during peak weekday hours, and can have long-term, coarse-grained time values (e.g., every two hours) during nights and weekends.

Each state for a load can be modeled with a variable x (e.g., a multi-dimensional variable), and a state-transition function $f$.

$$x_{t+1} = f(t, x_t, u(x_t, t)). \quad (3)$$

Further, the control function $u(x_t, t)$ provides a control action taken by the load when the load is in state $x_t$ at time $\tau_t$. For example, for a thermo load such as a freezer, the state might include the load's current temperature and its current on/off state. For a deferrable load, like a dryer, the state might be the load's remaining projected operating time.

An energy-consumption function, e, and a disutility-cost function, d, indicate costs for operating, or not operating, the load at a certain time instance:

$$e_t = e(t, x_t, u(x_t, t)) \quad (4)$$

$$d_t = d(t, x_t, u(x_t, t)) \quad (5)$$

The energy-consumption value, $e_t$, indicates an amount of energy consumed by the load at time instance t. Further, the disutility cost, d, indicates a disutility cost to the user if the load is not operated at time instance t. For example, for the dryer mentioned above, the disutility d(.) function can indicate a penalty for operating the dryer past a deadline. This penalty indicates the inconvenience of operating the dryer past the deadline because it can lead to the user not having more clean clothes to choose from.

The disutility cost can be measured relative to an ideal operation. For example, an air-conditioner that is maintaining a normal home temperature can be assigned a disutility cost of zero. However, if the air-conditioner were configured to a temperature higher than the home-owner's preferred temperature, the air-conditioner can be assigned a positive-valued disutility cost to model the user's discomfort.

The energy-price vector, $\Lambda$, indicates energy prices for a load across the sequence of discrete time values:

$$\Lambda = \lambda_1, \lambda_2, \lambda_3, \ldots \lambda_T \quad (2)$$

where $\lambda_j$ is the price during the time interval $[\tau_j, \tau_{j+1})$. The energy retailer can choose these energy prices to cause users to shift their energy consumption toward off-peak time intervals.

In some embodiments, the system can determine an optimal operating schedule across time t for the load by determining states $x_t$ that minimize the following:

$$\sum_{t=1}^{T} \lambda_t e_t + d_t. \quad (6)$$

In a deterministic system, the variable $u_t$ can be used in place of $u(x_t, t)$ when only one control action is to be used at each time value. Thus, the system can determine the load's optimal operating schedule (e.g., by computing equation 6) subject to:

$$x_{t+1} = f(t, x_t, u_t);$$

$$e_t = e(t, x_t, u_t); \text{ and}$$

$$d_t = d(t, x_t, u_t). \quad (7)$$

Energy-Disutility Graph

In some embodiments, the system maps the states $x_t$ to a general-purpose energy-disutility graph that represents the energy-cost and disutility cost for the load, while omitting the state variables x and functions $f$, e, and d. Thus, the consumer's system can easily communicate this energy-disutility graph to an energy retailer, and the energy retailer can perform load management and aggregation by selecting an optimal path of the energy-disutility graph, without having to compute an optimization involving the load-specific state variables and functions $x_t$, $f$, e, and d.

Figure 4:
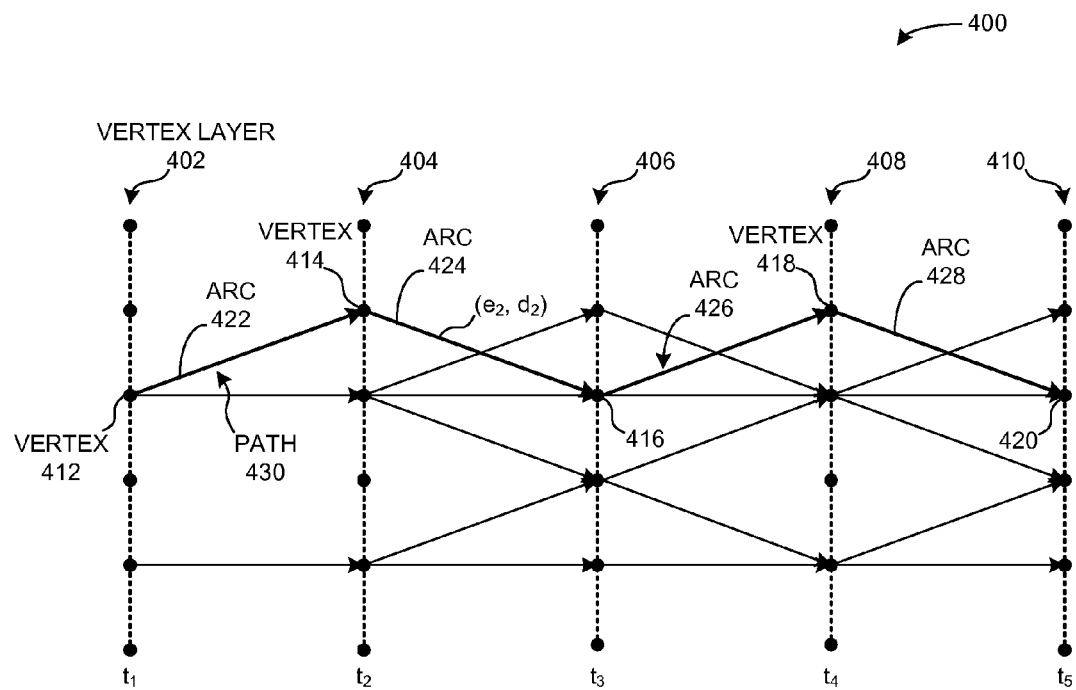
FIG. 4 illustrates an energy-disutility graph in accordance with an embodiment.

FIG. 4 illustrates an energy-disutility graph 400 in accordance with an embodiment. Energy-disutility graph 400 provides a trellis structure that includes a plurality of state vertices for each of a sequence of time instances, such that each arc of the trellis structure couples vertices for adjacent time instances. This trellis structure ensures that each path through energy-disutility graph 400 (e.g., path 430) includes a collection of vertices that correspond to each of the discrete time values in $\mathcal{T}$ (e.g., vertices 412, 414, 416, 418, and 420).

The energy-disutility graph G={V, A} has vertices V that are associated with specific time values, and can be separated into time layers:

$$V = V_1 \cup V_2 \cup \ldots V_T \quad (8)$$

For example, vertex layer 402 includes vertices corresponding to time instance $t_1$. Similarly, vertex layers 404, 406, 408, and 410 include vertices corresponding to time instances $t_2$, $t_3$, $t_4$, and $t_5$, respectively. Further, an arc in A couples vertices in adjacent layers:

$$a_{tij} = \{v_{ti}, v_{(t+1)j}\}, \quad (9)$$

where:

$$v_{ti} \in V_t \quad (10)$$

$$v_{(t+1)j} \in V_{t+1}. \quad (11)$$

In equation (9) and hereinafter, a vertex $v_{ti}$ corresponds to (e.g., the $i^{th}$ vertex at time t). Further, in some embodiments, an arc $a_{tij}$ that couples vertices $v_{ti}$ and $v_{(t+1)j}$ can include an energy-disutility model that indicates two weighted values for a time instance t: the energy cost $e(a_{tij})$, and the disutility cost $d(a_{tij})$. For example, arc 424 indicates an energy-disutility model $(e_2, d_2)$.

In some embodiments, a path (e.g., path 430) can correspond to a cycling load such as an air-conditioning unit. Thus, the vertices for path 430 can alternate between "on" and "off" power states. An arc 422 couples vertices 412 and 414, which correspond to the operating states at time instances $t_1$ and $t_2$, respectively. Thus, arc 422 indicates the energy and disutility costs associated with the cycling load during a time interval $[t_1, t_2)$. Similarly, arcs 424, 426, and 428 correspond to the energy and disutility costs during time intervals $[t_2, t_3)$, $[t_3, t_4)$, and $[t_4, t_5)$, respectively.

The system can send energy-disutility graph 400 to the energy retailer (or aggregator) to indicate the flexibility in a load's demand response (e.g., possible alternative states for each time interval). For cyclical loads, a sequence of time layers in graph 400 can repeat across some or all time instances (e.g., vertex layers 404 and 406 repeat at layers 408 and 410, respectively). Thus, the system can send one instance of the repeating layers (e.g., layers 404 and 406) to the energy retailer, and the energy retailer can reproduce the repeating layers using the received instance. In some other embodiments, the system can send a trellis generator to the energy retailer, and the energy retailer uses this trellis generator to determine the states and arcs for the sequence of time instances in energy-disutility graph 400. Alternatively, the system can send parameters for a standard library of trellis generators, and the energy retailer can reconstruct energy-disutility graph 400 using these parameters and a trellis generator in the standard library.

Generating an Energy-Disutility Graph

In some embodiments, the energy management system constructs the energy-disutility graph by mapping each state, $x_t$, of a load to a vertex, $v_{ti}$, in the energy-disutility graph using an encode function:

$$\mathrm{encode}(x_t) \mapsto v_{ti} \quad (12)$$

The encoding function can be specific to a load, or to a class of loads. For example, if a thermo load's state is its current temperature, then the encoding function may choose the vertex $v_{ti}$ with an index i that corresponds to the nearest value in a set of quantized temperature values. For higher-dimensional x, the system can use a radix-based encoding function to encode all the dimensions into a single integer i (e.g., the "reshape" function in MatLab).

In some embodiments, the encoding function can implement a many-to-one mapping, where many states $x_t$ can map to a certain vertex. Thus, a decoding function can map a vertex of the energy-disutility graph into a single representative state $\bar{x}_t$, which is one of the possible matching states:

$$\mathrm{decode}(v_{ti}) \mapsto \bar{x}_t \quad (13)$$

In equation (13) and hereinafter, the overlined x indicates a single representative state from a set of possible states that could be inverses of the encode function. The energy management system can use the decoding function to determine state parameters for a vertex of the energy-disutility graph, so that the system can determine a destination vertex to which it maps.

Figure 5:
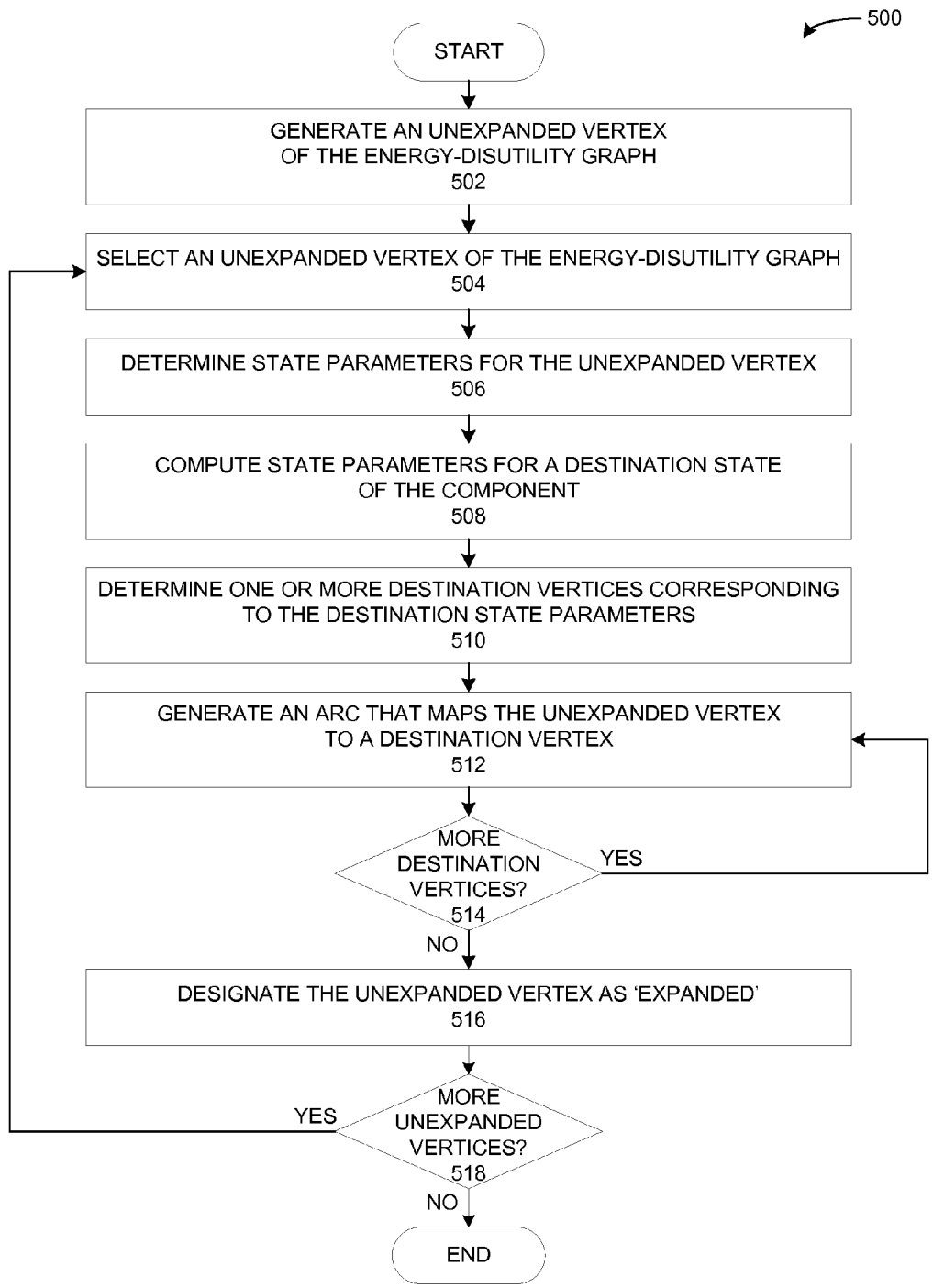
FIG. 5 presents a flow chart illustrating a method for generating an energy-disutility graph in accordance with an embodiment.

FIG. 5 presents a flow chart illustrating a method for generating an energy-disutility graph in accordance with an embodiment. During operation, the system generates an initial set of vertices (operation 502), which can correspond to the current state for each of a set of loads. Further, the system can mark the initial set of vertices as "unexpanded."

Next, the system selects an unexpanded vertex of the energy-disutility graph (operation 504), and determines state parameters for the unexpanded vertex (operation 506). For a vertex $v_{ti}$, the system determines its representative state using the decode function:

$$\bar{x}_t^{(i)} = \mathrm{decode}(v_{ti}) \quad (14)$$

Then, the system computes state parameters for a destination state of the load (operation 508). The system can use the state-transition function from equation (3) to determine the destination states $\hat{x}_{t+1}$ accessible from states $\bar{x}_t^{(i)}$ for each possible control function $u(\bar{x}_t^{(i)}, t)$:

$$\hat{x}_{t+1} = \Theta(t, \bar{x}_t^{(i)}, u(\bar{x}_t^{(i)}, t)) \quad (15)$$

In equation (15) and hereinafter, the circumflex over the x indicates a forward image of a representative point (overlined x) under the state-transition function. In some embodiments, the control function can correspond to a "turn on" or a "turn off" operation for the load. In other embodiments, the control function can correspond to a certain finite set of possible actions for the load.

The system determines one or more destination vertices by applying equation (15) for each possible control action $u_t^k$ (operation 510). For each possible control action, the system can identify a destination vertex j in the energy-disutility graph by encoding the destination state:

$$v_{(t+1)j} = \mathrm{encode}(\hat{x}_{t+1}) \quad (16)$$

The system then generates an arc $a_{tij}$ that maps the unexpanded vertex to the destination vertex (operation 512), and adds the arc to the energy-disutility graph. The system can determine the energy and disutility costs for the arc $a_{tij}$ using equations (4) and (5):

$$e(a_{tij}) = e(t, \bar{x}_t^{(i)}, u_t^{(k)}) \quad (17)$$

$$d(a_{tij}) = d(t, \bar{x}_t^{(i)}, u_t^{(k)}) \quad (18)$$

In some embodiments, the system can extend the decode function to account for the control action used in equation (15) when the arc was added:

$$\mathrm{decode}(a_{tij}) \mapsto u_t^{(k)} \quad (19)$$

The disutility cost can be measured relative to an ideal operation. For example, an air-conditioner that is maintaining a normal home temperature can be assigned a disutility cost of zero. However, if the air-conditioner were configured to a temperature higher than the home-owner's preferred temperature, the air-conditioner can be assigned a positive-valued disutility cost to model the user's discomfort.

In some embodiments, the unexpanded vertex can have more than one destination state (e.g., when a load has multiple control actions $u_t^{(k)}$). Thus, the system can determine whether there are more destination states for the unexpanded vertex (operation 514). If so, the system can return to operation 512 to generate an arc to a different destination vertex. Otherwise, if the unexpanded vertex does not have more destination states, the system can continue to mark the unexpanded vertex as "expanded" (operation 516).

The system can then determine whether there are more unexpanded vertices in the energy-disutility graph (operation 518). If so, the system can return to operation 504 to select another unexpanded vertex.

In some embodiments, decoding and encoding state variables can introduce error in the energy-disutility graph. While the weights computed for the arc $a_{tij}$ accurately reflect the consequences of the control action $u_t^{(k)}$, the state $x_{t+1}$ may not have precisely reached the representative state of vertex $v_{(t+1)j}$. The system can compute the error $\epsilon$ of arc $a_{tij}$ at its destination by computing the difference:

$$\epsilon(a_{tij}) = \hat{x}_{t+1} - \text{decode}(\text{encode}(\hat{x}_{t+1})) \tag{20}$$

or $$\epsilon(a_{tij}) = \hat{x}_{t+1} - \bar{x}_{t+1}^{(j)} \tag{21}$$

If the error is too large, a finer time-step size may be used in the trellis generation.

Generating an Operating Schedule

In some embodiments, the energy management system can determine an operating schedule for a load based on an energy-price vector $\Lambda$ received from an energy provider. Once the system determines the energy price $\lambda_t$ for time t, the system can reduce an arc's vector of weights $\{e(a_{tij}), d(a_{tij})\}$ to a scalar cost $c(.)$ as follows:

$$c(a_{tij}) = \lambda_t e(a_{tij}) + d(a_{tij}) \tag{22}$$

Further, the system can determine the optimal operation of a load by determining a shortest path through the energy-disutility graph that minimizes the sum of the costs on the arcs $c(a_{tij})$. A path, p, can be defined as a sequence of nodes $v_0, v_1, v_2, \ldots v_{T+1}$, where there exists an arc $a_t = \{v_t, v_{t+1}\}$ between each pair of adjacent nodes:

$$p = \{v_{0i_0}, v_{1i_1}, v_{2i_2}, \ldots v_{(T+1)i_{(T+1)}}\} \tag{23}$$

Here, $v_0$ and $v_{T+1}$ are additional source and sink nodes corresponding to start and end vertices for the energy-disutility graph. Alternatively, the system can define path p as a sequence of arcs $\{a_0, a_1, \ldots a_T\}$, such that adjacent arcs share nodes.

In some embodiments, the system represents the path p using a vector of indices, such that an index $i_t$ indicates a corresponding vector $v_t$ in the set $V_t$:

$$p = \{i_0, i_1, i_2, \ldots i_{T+1}\}. \tag{24}$$

Thus, the shortest path through an energy-disutility graph G, given prices $\Lambda$, is computed as follows:

$$p^*(G, \Lambda) = \underset{p = \{i_0, i_1, i_2, \ldots i_{T+1}\}}{\arg\min} \sum_{t=0}^{T} c(a_{t i_t i_{t+1}}) \tag{25}$$

The system can compute the shortest path through the energy-disutility graph sequentially across the time layers. Thus, the computational complexity for computing the shortest path is $O(|A|)$, where $|A|$ is no larger than $O(|V^2|)$ and is usually much smaller if the sizes of the $V_t$ are reasonably uniform. In some embodiments, the system can compute the shortest path using a vector-oriented programming language (e.g., MatLab), and treats the shortest path problem as a product of matrices over the $\{\min, +\}$ semi-ring:

$$\Pi_{t=1}^T C_t \tag{26}$$

where:

$$E_t(i,j) = e(a_{tij}) \tag{27}$$

$$D_t(i,j) = d(a_{tij}) \tag{28}$$

$$C_t = \lambda_t E_t + D_t \tag{29}$$

In some embodiments, the system can receive the energy-price vector from the energy provider periodically (TOU prices), or in response to sudden changes in energy supply or demand (CPP prices).

In some embodiments, the consumer's energy management system can generate an updated energy-price vector in anticipation of a change in energy price when the system does not receive the price-change vector from the aggregator. This allows the system to account for predictable changes to an energy-related parameter that can affect the price of energy. For example, if the weather forecast for the following week changes to indicate an upcoming heat wave, the system can use this weather forecast to determine an expected price for energy during the heat wave. This foresight into possible energy price fluctuations can influence the system to perform certain high energy-consuming tasks before an expected increase in energy price, or to postpone these tasks until an expected decrease in energy price.

Figure 6:
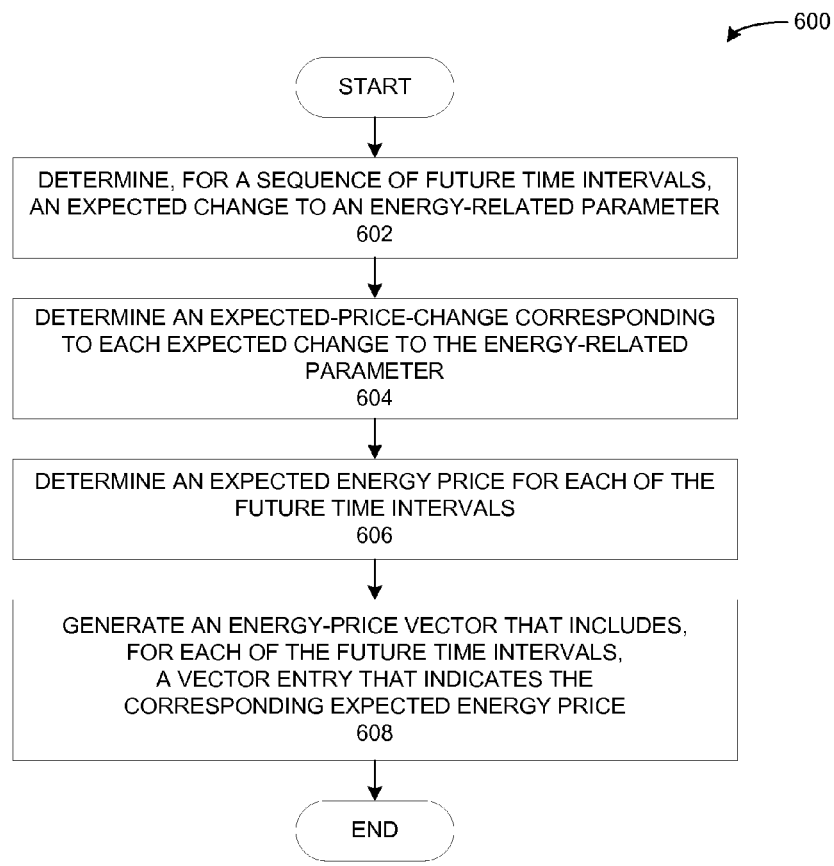
FIG. 6 presents a flow chart illustrating a method for determining an energy-price vector in accordance with an embodiment.

FIG. 6 presents a flow chart illustrating a method for determining an energy-price vector in accordance with an embodiment. During operation, the system determines an expected change to an energy-related parameter for a sequence of future time intervals (operation 602).

Next, the system determines an expected-price-change corresponding to each expected change to the energy-related parameter (operation 604). The energy-related parameter, for example, can include: a weather forecast at the future time instance; a market price for an energy source at the future time instance; or a holiday event for the future time instance. The energy-related parameter can also include: a day of month for the future time instance; a day of week for the future time instance; or a time of day for the future time instance.

Then, the system can determine an expected energy price for each of the future time intervals, for example, by adding an expected-price-change to an energy price for the corresponding time interval (operation 606). The system then generates an energy-price vector that includes vector entries indicating an expected energy price for each of future time intervals (operation 608).

Energy Retailer Response to Energy-Demand Bid

An energy aggregator typically obtains a contract with an ISO to deliver a large energy-demand response action to the ISO, and it fulfills the contract by eliciting a demand response action from a group of energy consumers that are enrolled with the aggregator.

In some embodiments, a consumer's energy management system can determine a load's optimal operating schedule corresponding to certain baseline prices: $\Lambda^{base}$ (e.g., the current retail prices). However, sometimes it becomes necessary for the aggregator to adjust the energy price in response to an unanticipated demand. The aggregator can generate a price-change vector, $\delta\Lambda$, that indicates a change in energy price for a sequence of discrete time intervals:

$$\delta\Lambda=\{\lambda_1,\delta\Lambda_2,\ldots\delta\lambda_T\} \quad (30)$$

The consumer's system can then use the price-change vector to determine a new (e.g., alternative) energy-price vector:

$$\Lambda=\Lambda^{base}+\delta\Lambda \quad (31)$$

The aggregator can determine the price-change vector, $\delta\Lambda$, such that it can influence each load to follow a new operating schedule that achieves a desired energy response.

In some embodiments, the consumer's system can choose between the new energy-price vector, or the baseline energy-price vector. For example, the system can determine a shortest path through the energy-disutility graph for the new and the baseline energy-price vectors, and can select the energy-price vector that results in the shortest path (e.g., the path with the lowest overall cost).

A load that chooses the new energy-price vector is referred to as a participating load. Further, because the aggregator stores a copy of the energy-disutility graphs for the group of loads, the aggregator can determine in advance which loads are likely to participate in the response. Thus, the aggregator can generate a price-change vector, $\delta\Lambda$, that results in a desired aggregate energy response, even with less than 100% participation.

The energy profile of a path p through an energy-disutility graph G is represented by the vector:

$$e(p,G)=\langle e(a_{p_t p_{t+1}})\rangle \quad (32)$$

The total cost, c, of a path p through an energy-disutility graph G is computed using:

$$c(p,G,\Lambda)=\Sigma_t c(a_{p_t p_{t+1}}) \quad (33)$$

This follows equation (22) where the cost c includes both an energy cost and a disutility cost. However, in some embodiments, the aggregator may be primarily interested in minimizing the consumer's energy cost:

$$h(p,G,\Lambda)=\Sigma_t \lambda_t e(a_{p_t p_{t+1}}) \quad (34)$$

Thus, the aggregator can select a path through the energy-disutility graph that minimizes the consumer's energy cost and ignores the consumer's disutility cost. Then, the aggregator can determine an energy-price vector that influences consumers' systems to select this path (e.g., when both the energy and disutility costs are considered).

For a shortest path, p*, which is determined according to the costs c using equation (25), the cost functions can be represented with the following shortened notation:

$$e^*(G,\Lambda)=e(p^*(G,\Lambda),G) \quad (35)$$

$$c^*(G,\Lambda)=c(p^*(G,\Lambda),G,\Lambda)(\text{energy+disutility cost}) \quad (36)$$

$$h^*(G,\Lambda)=h(p^*(G,\Lambda),G,\Lambda)(\text{energy cost}) \quad (37)$$

This shortened notation indicates that the energy retailer computes the shortest path p* with respect to the combined (energy+disutility) costs c (e.g., in the consumer's best interest), such that the path is also used in equation (37) to compute the energy costs h in which the energy retailer is interested. Thus, the path p* corresponds to an operating schedule that is the best choice for the end-user (given the determined energy-price vector), and minimizes the energy costs h.

For an aggregate $\mathcal{A}$ of N loads, the graph $G_k$ provides the energy-disutility graph of the $k^{th}$ load. The aggregated energy profile is the sum of the energy profiles for the N individual loads:

$$e^*(\mathcal{A},\Lambda)=\Sigma_{k=1}^N e^*(G_k,\Lambda) \quad (38)$$

Typically, an aggregator generates an energy-price vector to elicit a particular energy response, for example, to reduce energy consumption for a future time interval $[\tau_j,\tau_{j+k}]$. This target response is denoted using a subset $\delta E$ of the real vector space of energy profiles, which contains the differential response:

$$e^*(\mathcal{A},\Lambda^{base}+\delta\Lambda)-e^*(\mathcal{A},\Lambda^{base})\in\delta E \quad (39)$$

For example, if the target response is to reduce energy in the time interval $[t_j,\tau_{j+k}]$, then $\delta E$ can be defined as all vectors $(e_i)$ such that:

$$e_i < \begin{cases} -K & \text{if } j \le i < k \\ K/10 & \text{otherwise} \end{cases} \quad (40)$$

The second line in expression (40) avoids a "rebound" effect outside the time interval $[\tau_j, \tau_{j+k}]$.

The voluntary load participation is modeled using integer variables $s_i=\{0,1\}$ that indicate which loads are participating in the new energy-price vector. Thus, using the participation variables $s_i$, the aggregator's profit optimization problem is represented as follows:

$$\text{minimize } \Sigma_{k=1}^N -s_k(h^*(G_k,\Lambda)-h^*(G_k,\Lambda^{base}))$$

$$\text{subject to } \Sigma_{k=1}^N s_k(e^*(G_k,\Lambda)-e^*(G_k,\Lambda^{base}))\in\delta E$$

$$\forall_k s_k(c^*(G_k,\Lambda)-c^*(G_k,\Lambda^{base}))<0$$

$$\forall_k (1-s_k)(c^*(G_k,\Lambda)-c^*(G_k,\Lambda^{base}))\ge 0$$

$$s_k\in\{0,1\}$$

$$\delta\Lambda=\Lambda-\Lambda^{base} \quad (41)$$

In some embodiments, based on the optimization (41), the aggregator does not select the participating loads (e.g., select $s_k$) arbitrarily. For any given energy-price-change vector $\epsilon\Lambda$, the aggregator determines the participating loads using variables $s_i$ that indicate the loads that benefit from the new energy-price vector. The aggregator can enroll these loads with the expectation that these loads "volunteer" to participate by providing an energy-disutility graph to the aggregator as a bid. The aggregator then bids the objective value from the above optimization (41) to an ISO to produce a requested demand response.

In some embodiments, after an energy retailer or an aggregator has delivered a price-change to the consumers' energy managers or loads, it is desirable for the loads that decide to participate to lock-in the change, by incorporating it into their base price. For example, when a consumer k is participating, the price-change vector, $\delta\Lambda$, received from the aggregator is added to the load's baseline prices:

$$\Lambda_{k(t+1)}^{base}=\text{time shift}(\Lambda_{kt}^{base}+s_k\delta\Lambda_t) \quad (42)$$

Thus, the energy retailer can adjust the energy price for a group of consumers without reneging on any future price incentives offered to any particular consumer. The "time shift" operator in equation (42) indicates that this method of eliciting demand response with price changes can be applied in a model predictive control manner: in each time step the consumers loads or energy manager send a new energy-disutility graph describing the future operations, the aggregator determines an optimal price change, and then participating loads incorporate the price change into their base price. This capability allows the energy retailer or aggregator to offer new, online, cumulative price adjustments to tune the accuracy of current energy response, or to quickly respond to sudden demand response needs from an ISO.

Figure 7:
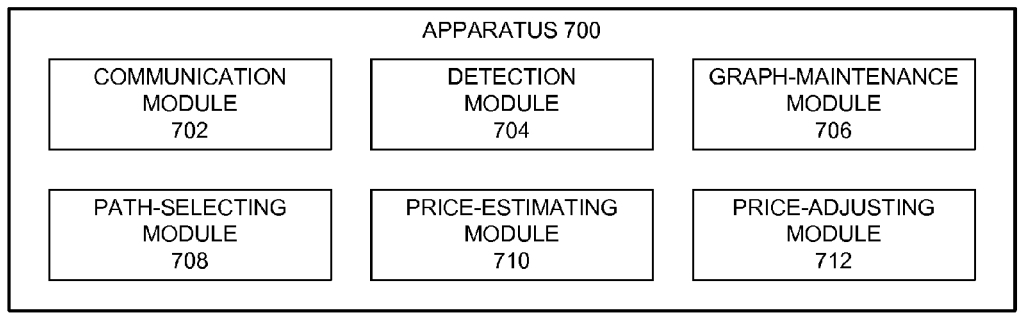
FIG. 7 illustrates an exemplary apparatus that facilitates generating an energy-demand bid for an energy provider in accordance with an embodiment.

FIG. 7 illustrates an exemplary apparatus that facilitates generating an energy-demand bid for an energy provider in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a communication module 702, a detection module 704, a graph-maintenance module 706, a path-selecting module 708, a price-estimating module 710, and a price-adjusting module 712.

In some embodiments, communication module 702 can receive an energy-price vector from an energy retailer. Detection module 704 can identify one or more loads coupled to apparatus 700. Graph-maintenance module 706 can generate an energy-disutility graph that includes, for each of a sequence of discrete time instances, one or more vertices that each corresponds to an alternative operating state for a load. The energy-disutility graph also includes one or more arcs, such that an arc that couples two vertices indicates an energy-disutility model corresponding to energy and disutility costs for the load. Communication module 702 can also communicate an energy-demand bid to the energy provider, wherein the energy-demand bid includes the energy-disutility graph.

Path-selecting module 708 can select a path through the energy-disutility graph based on the energy-price vector, and can determine an operating schedule for the load based on the selected path. Price-estimating module 710 can determine an expected change in energy price based on an expected change in value to an energy-related parameter. Price-adjusting module 712 can determine a new energy price, by adding the expected change in energy price to a base energy price for the future time instance.

Figure 8:
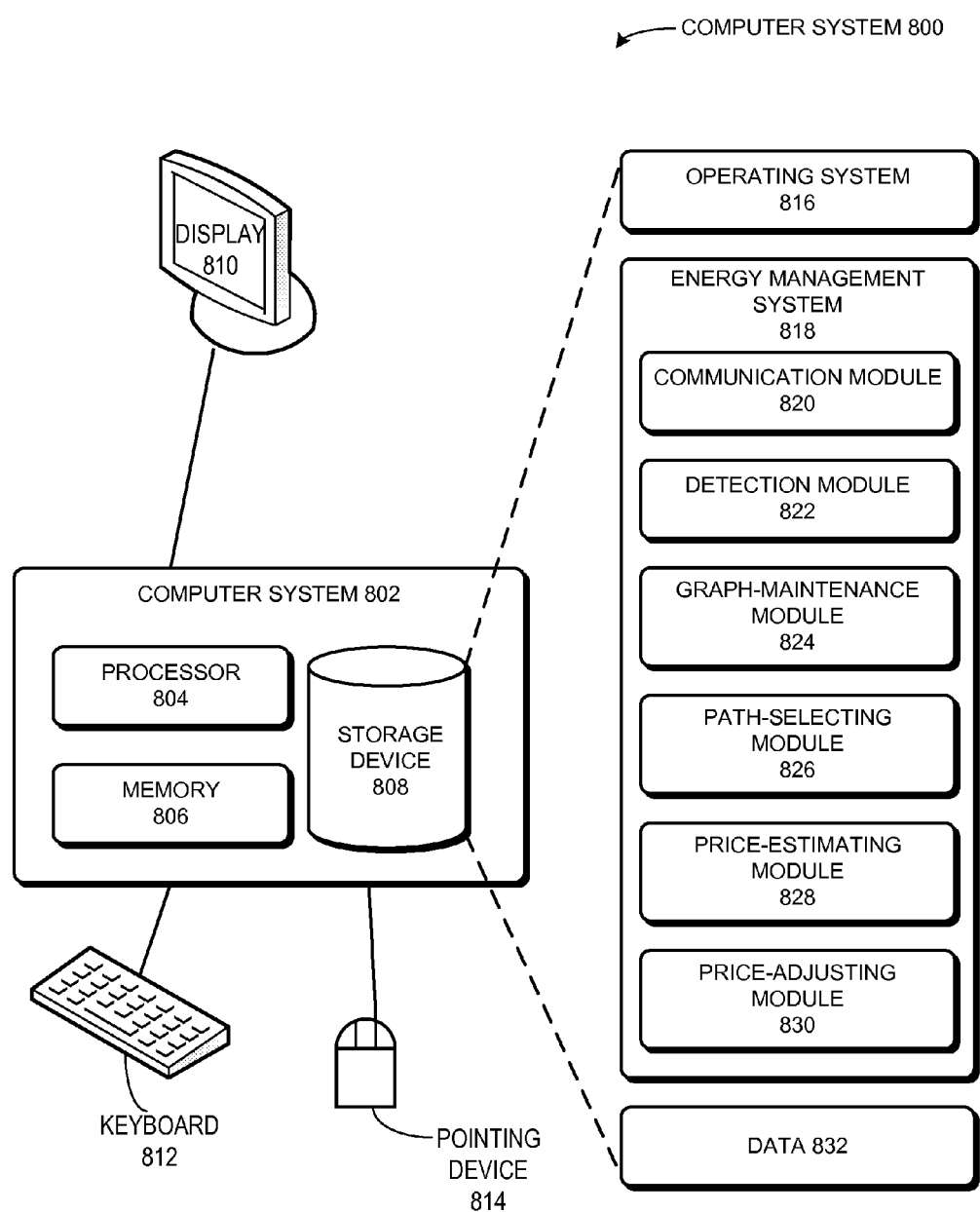
FIG. 8 illustrates an exemplary computer system that facilitates generating an energy-demand bid for an energy provider in accordance with an embodiment.

FIG. 8 illustrates an exemplary computer system that facilitates generating an energy-demand bid for an energy provider in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store an operating system 816, an energy management system 818, and data 832.

Energy management system 818 can include instructions, which when executed by computer system 802, can cause computer system 802 to perform methods and/or processes described in this disclosure. Specifically, energy management system 818 may include instructions for receiving an energy-price vector from an energy retailer, and for communicating an energy-demand bid to an energy retailer (communication module 820). Further, energy management system 818 may include instructions for identifying one or more loads coupled to computer system 802 (detection module 822). Energy management system 818 may also include instructions for generating an energy-disutility graph (graph-maintenance module 824). The energy-disutility graph includes, for each of a sequence of discrete time instances, one or more vertices that each corresponds to an alternative operating state for a load. The energy-disutility graph also includes one or more arcs, such that an arc that couples two vertices indicates an energy-disutility model corresponding to energy and disutility costs for the load.

Energy management system 818 may include instructions for selecting a path through the energy-disutility graph based on the energy-price vector, and determining an operating schedule for the load based on the selected path (path-selecting module 826). Further, energy management system 818 may include instructions for determining an expected change in energy price based on an expected change in value to an energy-related parameter (price-estimating module 828). Energy management system 818 may also include instructions for determining a new energy price, by adding the expected change in energy price to a base energy price for the future time instance (price-adjusting module 830).

Data 832 can include any data that is required as input or that is generated as output by the methods and/or processes described in this disclosure. Specifically, data 832 can store at least state information for one or more loads, load-specific state-transition functions for the one or more loads, an energy price vector from an energy retailer, and an energy-disutility graph for the one or more loads.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
identifying, by a computer, one or more electrical components coupled to an energy management system;
obtaining, by the computer, settings information from a respective component to determine a historical operating schedule for the respective component;
generating, by the computer, an energy-disutility graph that is a connected graph that indicates an energy consumption for the one or more components, wherein generating the energy-disutility graph involves:

generating, for each of a sequence of discrete time instances, one or more vertices that each corresponds to an alternative operating state for the respective component computing, for a pair of generated vertices that correspond to two adjacent time instances of the energy-disutility graph, an energy disutility cost that corresponds to a consumer's perceived cost of not utilizing the respective component between the two adjacent time instances and is based at least on the operating schedule; and generating an arc that couples the pair of generated vertices and indicates the computed energy disutility cost;

determining price information for energy;

determining, by the computer, a new operating schedule for the respective component by traversing the energy-disutility graph based on the price information;

generating, for the respective component, updated settings information that includes the new operating schedule;

sending the updated settings information to the respective component and implementing, by the respective component, an operation based on the updated settings information.

2. The method of claim 1, wherein the energy-disutility graph includes a trellis structure with one or more vertices for a sequence of time instances, and wherein generating the energy-disutility graph further comprises:

generating the one or more vertices by:

generating an unexpanded vertex for the respective component;

determining state parameters for the unexpanded vertex based on a decode function associated with the respective component, wherein the decode function maps a respective vertex to a corresponding operating state of a component;

computing state parameters for a target-state of the respective component based on a state-transition function and a control-action function, wherein the control-action function maps an operating state and a time to a control action that is to be taken by a component, and wherein the state-transition function determines one or more destination operating states accessible from one or more operating states associated with a control action; and determining a second vertex corresponding to the target-state parameters based on an encode function associated with the respective component, wherein the encode function maps a respective operating state of a component to a corresponding vertex.

3. The method of claim 1, wherein determining the price information for energy comprises receiving, from an aggregator or an energy provider, a proposed price for energy corresponding to one or more discrete time intervals.

4. The method of claim 1, wherein the price information for energy includes an energy-price vector, which indicates an expected price for energy over a sequence of discrete time instances; and wherein determining the operating schedule for the respective component comprises:

selecting a path through the energy-disutility graph based on the energy-price vector; and determining the operating schedule for the respective component based on the selected path.

5. The method of claim 4, wherein determining the price information for energy comprises:

determining an expected change in energy price for a future time instance;

determining a new energy price, by adding the expected change in energy price to a base energy price for the future time instance; and storing the new energy price at an entry of the energy-price vector that corresponds to the future time instance.

6. The method of claim 5, wherein determining the expected change in energy price for the future time instance comprises determining an expected change in value to an energy-related parameter that influences a price for energy from an energy provider; and wherein the energy-related parameter is selected from the group consisting of:

a weather forecast at the future time instance;

a market price for an energy source at the future time instance;

a holiday event for the future time instance;

a day of month for the future time instance;

a day of week for the future time instance; and a time of day for the future time instance.

7. The method of claim 1, further comprising communicating an energy-demand bid to an aggregator, wherein the energy-demand bid includes the energy-disutility graph.

8. The method of claim 7, wherein the aggregator is an energy provider.

9. A non-transitory computer-readable storage medium storing instructions that when executed by a computer cause the computer to perform a method, the method comprising:

identifying, by a computer, one or more electrical components coupled to an energy management system;

obtaining, by the computer, settings information from a respective component to determine a historical operating schedule for the respective component generating, by the computer, an energy-disutility graph that is a connected graph that indicates an energy consumption for the one or more components, wherein generating the energy-disutility graph involves:

generating, for each of a sequence of discrete time instances, one or more vertices that each corresponds to an alternative operating state for the respective component computing, for a pair of generated vertices that correspond to two adjacent time instances of the energy-disutility graph, an energy disutility cost that corresponds to a consumer's perceived cost of not utilizing the respective component between the two adjacent time instances and is based at least on the historical operating schedule; and generating an arc that couples the pair of generated vertices and indicates the computed energy disutility cost;

determining price information for energy determining, by the computer, a new operating schedule for the respective component by traversing the energy-disutility graph based on the price information;

generating, for the respective component, updated settings information that includes the new operating schedule;

sending the updated settings information to the respective component and implementing, by the respective component, an operation based on the updated settings information.

10. The storage medium of claim 9, wherein the energy-disutility graph includes a trellis structure with one or more vertices for a sequence of time instances, and wherein generating the energy-disutility graph further comprises:

generating the one or more vertices by:
  generating an unexpanded vertex for the respective component;
  determining state parameters for the unexpanded vertex based on a decode function associated with the respective component, wherein the decode function maps a respective vertex to a corresponding operating state of a component;
  computing state parameters for a target-state of the respective component based on a state-transition function and a control-action function, wherein the control-action function maps an operating state and a time to a control action that is to be taken by a component, and wherein the state-transition function determines one or more destination operating states accessible from one or more operating states associated with a control action; and
  determining a second vertex corresponding to the target-state parameters based on an encode function associated with the respective component, wherein the encode function maps a respective operating state of a component to a corresponding vertex.

11. The storage medium of claim 9, wherein determining the price information for energy comprises receiving, from an aggregator or an energy provider, a proposed price for energy corresponding to one or more discrete time intervals.

12. The storage medium of claim 9, wherein the price information for energy includes an energy-price vector, which indicates an expected price for energy over a sequence of discrete time instances; and
  wherein determining the operating schedule for the respective component comprises:
    selecting a path through the energy-disutility graph based on the energy-price vector; and
    determining the operating schedule for the respective component based on the selected path.

13. The storage medium of claim 12, wherein determining the price information for energy comprises:
  determining an expected change in energy price for a future time instance;
  determining a new energy price, by adding the expected change in energy price to a base energy price for the future time instance; and
  storing the new energy price at an entry of the energy-price vector that corresponds to the future time instance.

14. The storage medium of claim 13, wherein determining the expected change in energy price for the future time instance comprises determining an expected change in value to an energy-related parameter that influences a price for energy from an energy provider; and
  wherein the energy-related parameter is selected from the group consisting of:
    a weather forecast at the future time instance;
    a market price for an energy source at the future time instance;
    a holiday event for the future time instance;
    a day of month for the future time instance;
    a day of week for the future time instance; and
    a time of day for the future time instance.

15. The storage medium of claim 9, wherein the method further comprises communicating an energy-demand bid to an aggregator, wherein the energy-demand bid includes the energy-disutility graph.

16. The storage medium of claim 15, wherein the aggregator is an energy provider.

17. An apparatus comprising:
a processor; and
a storage device coupled to the processor and storing instructions that when executed by a computer cause the computer to perform a method, the method comprising:
  identifying one or more electrical components coupled to an energy management system;
  obtaining, settings information from a respective component to determine a historical operating schedule for the respective component usage information associated with current or historical settings;
  generating an energy-disutility graph that is a connected graph that indicates an energy consumption for the one or more components, wherein generating the energy-disutility graph involves:
    generating, for each of a sequence of discrete time instances, one or more vertices that each corresponds to an alternative operating state for the respective component
    computing, for a pair of generated vertices that correspond to two adjacent time instances of the energy-disutility graph, an energy disutility cost that corresponds to a consumer's perceived cost of not utilizing the respective component between the two adjacent time instances and is based at least on the historical operating schedule; and
    generating an arc that couples the pair of generated vertices and indicates the computed energy disutility cost;
  determining price information for energy; and
  determining a new operating schedule for the respective component by traversing the energy-disutility graph based on the price information;
  generating, for the respective component, updated settings information that includes the new operating schedule;
  sending the updated settings information to the respective component and
  implementing, by the respective component, an operation based on the updated settings information.

18. The apparatus of claim 17, wherein the energy-disutility graph includes a trellis structure with one or more vertices for a sequence of time instances, and wherein generating the energy-disutility graph further comprises:
  generating the one or more vertices by:
    generating an unexpanded vertex for the respective component;
    determining state parameters for the unexpanded vertex based on a decode function associated with the respective component, wherein the decode function maps a respective vertex to a corresponding operating state of a component;
    computing state parameters for a target-state of the respective component based on a state-transition function and a control-action function, wherein the control-action function maps an operating state and a time to a control action that is to be taken by a component, and wherein the state-transition function determines one or more destination operating states accessible from one or more operating states associated with a control action; and
  determining a second vertex corresponding to the target-state parameters based on an encode function associated with the respective component, wherein the encode function maps a respective operating state of a component to a corresponding vertex.

19. The apparatus of claim 17, wherein determining the price information for energy comprises receiving, from an aggregator or an energy provider, a proposed price for energy corresponding to one or more discrete time intervals.

20. The apparatus of claim 17, wherein the price information for energy includes an energy-price vector, which indicates an expected price for energy over a sequence of discrete time instances; and
wherein determining the operating schedule for the respective component comprises:
selecting a path through the energy-disutility graph based on the energy-price vector; and
determining the operating schedule for the respective component based on the selected path.

21. The apparatus of claim 20, wherein determining the price information for energy comprises:
determining an expected change in energy price for a future time instance;
determining a new energy price, by adding the expected change in energy price to a base energy price for the future time instance; and
storing the new energy price at an entry of the energy-price vector that corresponds to the future time instance.

22. The apparatus of claim 21, wherein determining the expected change in energy price for the future time instance comprises determining an expected change in value to an energy-related parameter that influences a price for energy from an energy provider; and
wherein the energy-related parameter is selected from the group consisting of:
a weather forecast at the future time instance;
a market price for an energy source at the future time instance;
a holiday event for the future time instance;
a day of month for the future time instance;
a day of week for the future time instance; and
a time of day for the future time instance.

23. The apparatus of claim 17, wherein the method further comprises communicating an energy-demand bid to an aggregator, wherein the energy-demand bid includes the energy-disutility graph.

24. The apparatus of claim 23, wherein the aggregator is an energy provider.

25. The method of claim 2, wherein generating the arc that couples the pair of generated vertices further comprises mapping the unexpanded vertex to the second vertex, wherein the computed disutility cost indicated by the arc further indicates disutility parameters corresponding to the respective component.

26. The storage medium of claim 10, wherein generating the arc that couples the pair of generated vertices further comprises mapping the unexpanded vertex to the second vertex, wherein the computed disutility cost indicated by the arc further indicates disutility parameters corresponding to the respective component.

27. The apparatus of claim 18, wherein generating the arc that couples the pair of generated vertices further comprises mapping the unexpanded vertex to the second vertex, wherein the computed disutility cost indicated by the arc further indicates disutility parameters corresponding to the respective component.

28. The method of claim 1, further comprising storing the new operating schedule for the respective component.

29. The storage medium of claim 9, wherein the method further comprises storing the new operating schedule for the respective component.

30. The apparatus of claim 17, wherein the method further comprises storing the new operating schedule for the respective component.

* * * * *